Patented Feb. 13, 1923.

1,445,382

UNITED STATES PATENT OFFICE.

JOE OLGIERD ZDANOWICH, OF LONDON, ENGLAND.

MANUFACTURE OF ACETOSE.

No Drawing. Application filed July 10, 1922. Serial No. 574,067.

*To all whom it may concern:*

Be it known that I, JOE OLGIERD ZDANO-WICH, a subject of the King of Great Britain' and residing at 2 Whitehall Court, London, S. W. I., England, have invented certain new and useful Improvements in the Manufacture of Acetose (for which I have made application in England, June 20, 1921), of which the following is a specification.
This invention deals with the manufacture of acetose, that is, such acetylated cellulose whose acetylated mixture can be used directly for spinning artificial silk, horsehair, and the like or for making films without first precipitating it and re-dissolving after as is the common practice with ordinary acetylated cellulose.

In my prior U. S. Patent No. 1,347,801, dated July 27, 1920, I have described methods for producing acetose according to which the cellulose is acetylated in two stages, one preparatory, the other final. In that patent I have shown that in this way one can avoid difficulties commonly met with by the use of strong condensing agents and at the same time one can obtain success with weak condensing agents in a reasonable time by forming these weak condensing agents or the like in a nascent state in the mass to be acetylated provided this action is followed by a second stage which includes the employment of a small quantity of a strong condensing agent.

I have now discovered that in the first stage I may employ no condensing agent, or I may use the weak condensing agents mentioned in my prior patent, or indeed any other weak condensing agent (for example, acetyl sulphuric acid, alkyl amines, such as methyl amine, aniline salts, sulphonic acid, phosphorous trichloride, pyridine, alkyl sulphates, such as methyl sulphate, dimethylamine sulphate, hydrochloric acid) in their ordinary form, that is to say, not in the nascent state under certain circumstances, the second stage being then carried into effect as before by the use of a small quantity of a strong condensing agent.

By a weak condensing agent I mean a condensing agent which has no injurious effect upon cellulose.

The object of the present invention is therefore to provide an improved or modified process for the production of acetose, an article produced by said process.

As an important feature of my invention, I produce acetose in two stages of which the preliminary stage involves treatment of the cellulose with an acetylating agent or mixture, either without a condensing agent or in the presence of a weak condensing agent, in its ordinary as distinct from its nascent state, and the second stage treatment of the product of the first stage by means of a small quantity of a strong condensing agent.

The invention also desirably includes a process as described above in which the first stage is conducted slowly, taking say not less than about three hours.

The invention preferably comprises an improved process as described above in which the first stage is conducted without any condensing agent in a closed vessel with or without a reflux condenser.

The invention also includes a process for the production of artificial silk, horsehair, films and the like which consists in preparing acetose by a method as described above and coagulating it by squirting it through fine orifices or capillary tubes into a coagulating bath, or by spreading it on a belt part of which is submerged in a coagulating bath, or by any other appropriate method.

In carrying the invention into effect in one form by way of example, I submit a cellulose, for instance, ordinary cotton paper, to the action of a mixture of glacial acetic acid and acetic anhydride only (that is to say without any condensing agent), the mixture consisting of for example 60 ccs. acetic anhydride and 110 ccs. of glacial acetic acid into which 20 grams of cellulose have been introduced. The mixture is placed in a closed vessel connected with a reflux condenser. This mixture is permitted to stand preferably at a temperature not lower than about 40° C. for several hours, say not less than 3 or 4 hours, but this depends on the kind of cellulose employed. Even among one class of cellulose such as cotton variations are found, but the minimum time which I recommend is that which will cause such partial or complete disintegration of the cellulose as can be seen on inspection. The mixture should be stirred as usual during the reaction which probably takes the form of slight acetylation, forming mono and possibly di-acetates of cellulose. Apparently such a slight acetylation is sufficient to enable advantage to be taken of the second stage involving a small quantity of a strong condensing agent which would not be operative or at least only with difficulty without the above preliminary stage or its equivalent.

It is preferred before the second stage is undertaken to leave the cellulose for such a time that it becomes thoroughly disintegrated. The whole mixture which then has the appearance of a thick paste is next left for cooling to about atmospheric temperature, say 15 to 20° C., or it may be cooled to a lower temperature.

The second stage consists in the addition to the above paste at a normal temperature or indeed even lower of a very small quantity of a strong condensing agent, for example, sulphuric acid, preferably diluted in glacial acetic acid for the purpose of ensuring an equal distribution thereof throughout the paste. The quantity of the strong condensing agent must be very small and may vary, for example, between about 0.5 per cent and 4 per cent by weight of the cellulose employed, the mass being constantly stirred during the addition.

The second stage is complete when the esters of cellulose which are formed become a clear colourless solution.

The method described above may be varied and yet yield good results. For example, it is immaterial whether acetic acid is employed in the first stage or what amount of acetic acid is used in that stage, because that substance there plays the role of a solvent only. It may be partially or wholly replaced by any other solvent, for example, formic acid. In addition the solvent whatever it may be can be partially replaced by a diluent, for example, by formaldehyde. Whichever solvent or diluent be used it should be such or added so that it does not precipitate cellulose acetates. In the case where formic acid is employed I have found that a certain amount of cellulose formates is formed in the course of the operation. Or ethylidene-diacetyl, which is a very good solvent for cellulose acetates.

As to the acetic anhydrides it is preferred to use in the first stage only half or thereabouts of the total quantity necessary for the complete esterification although the whole amount may be used if desired. In the case where only a proportion is used in the first stage the remaining part is added during the second stage, the quantity being such that with that previously employed the whole makes about 3 times by weight the amount of cellulose employed.

As to the acetic acid it may be added in the course of the first stage or after, or in the course of the second stage or after, and in such a quantity as to bring the contents of cellulose acetates formed in the mixture to a desirable percentage, which may vary according to the purpose for which the acetose is destined, that is artificial silk, or horsehair or films. Generally I found it to be very convenient to be within 6% to 10% by weight of the cellulose acetates in the mixture.

The invention is not limited to the above percentages, particularly the percentage of acetates or acetic acid, for this may vary considerably according to the mechanical arrangements used for either the artificial silk making or film production or denier of silk or thickness of the films to be produced.

The reaction in the first stage has been described as an example as being conducted in a vessel closed except for a connection to a reflux condenser. It may, however, take place in an open vessel, but in this case action is slow and I do not recommend this for that reason. Again, it may be effected in a completely closed vessel, that is, a vessel such as an autoclave in which case the temperature or pressure may be controlled so that the pressure in the autoclave is atmospheric pressure or some higher pressure. I prefer as far as possible to operate in such a way as to avoid loss of volatile matters such as acetic acid by evaporation.

Examples only of weak condensing agents have been given and others may be employed, of an appropriate amount, say from 2-15% of the cellulose by weight. Sulphuric acid has been mentioned as an example of a strong condensing agent. This may be substituted by other bodies, for example, phosphoric acid or chlorosulphuric acid, the amount however in all cases being as low as possible.

In place of the mixture of glacial acetic acid and acetic anhydride other acetylating agents or mixtures may be employed and the temperature may be raised, for example, up to 90° C. or even higher in the first stage.

The colourless solution referred to above or prepared by the other modifications of the process described after being submitted to the extraction of air bubbles and filtered is capable of being squirted through fine orifices or capillary tubes into a coagulating bath for the industrial manufacture of artificial silk, horsehair and the like. If desired, it may be formed into films by spreading a layer on a suitable endless belt, the greater part of which is submerged in a coagulating bath.

I claim as my invention:—

1. A process of manufacturing "acetose" which comprises treating cellulose with an acetylating agent in the presence of a weak condensing agent in its ordinary as distinct from its nascent state until a thick paste is obtained, and then subjecting the paste to the action of a strong condensing agent.

2. A process of manufacturing "acetose"

which comprises treating cellulose with an acetylating agent in the presence of a weak condensing agent in its ordinary as distinct from its nascent state at a temperature of about 40 degrees C., and then subjecting the product of the first stage to the action of a strong condensing agent.

3. A process of manufacturing "acetose" which comprises treating cellulose slowly during a period of not less than one hour, with an acetylating agent in the presence of a weak condensing agent in its ordinary as distinct from its nascent state and then subjecting the product of the first stage to the action of a strong condensing agent.

4. A process of manufacturing "acetose" which comprises treating cellulose with an acetylating agent in the absence of a condensing agent while in a closed vessel, and then subjecting the product of the first stage to the action of a strong condensing agent.

5. A process for manufacturing "acetose" which comprises treating cellulose with acetic anhydride for a considerable period until the cellulose has become a substantially completely disintegrated paste, and subsequently treating the resulting disintegrating material with a strong condensing agent.

6. A process of manufacturing "acetose" which comprises treating cellulose slowly during a period of not less than one hour with an acetylating agent in the presence of a weak condensing agent in its ordinary as distinct from its nascent state at a temperature of not less than 40 degrees C. until a disintegrated pasty mass is obtained, cooling said mass, and then subjecting it to the action of a strong condensing agent.

JOE OLGIERD ZDANOWICH.